(12) United States Patent
Dong

(10) Patent No.: US 9,660,461 B2
(45) Date of Patent: May 23, 2017

(54) CHARGING ASSEMBLY AND CHARGING CONTROL METHOD

(71) Applicant: CHERVON INTELLECTUAL PROPERTY LIMITED, Road Town (VG)

(72) Inventor: Zhijun Dong, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 184 days.

(21) Appl. No.: 14/559,181

(22) Filed: Dec. 3, 2014

(65) Prior Publication Data

US 2015/0162758 A1 Jun. 11, 2015

(30) Foreign Application Priority Data

Dec. 10, 2013 (CN) .......................... 2013 1 0666634

(51) Int. Cl.

| H02J 7/00 | (2006.01) |
|---|---|
| H01M 10/42 | (2006.01) |
| H01M 10/44 | (2006.01) |
| H01M 10/48 | (2006.01) |
| H01M 10/052 | (2010.01) |

(52) U.S. Cl.
CPC ....... *H02J 7/0021* (2013.01); *H01M 10/4257* (2013.01); *H01M 10/441* (2013.01); *H01M 10/482* (2013.01); *H02J 7/0086* (2013.01); *H01M 10/052* (2013.01); *H01M 2010/4278* (2013.01); *H02J 2007/0098* (2013.01)

(58) Field of Classification Search
CPC ............. H02J 7/0021; H02J 2007/0098; H02J 7/0013; H02J 7/007; H02J 7/0086; H01M 10/052; H01M 10/4257; H01M 10/441; H01M 10/482; H01M 2010/4278
See application file for complete search history.

(56) References Cited

U.S. PATENT DOCUMENTS

2011/0156660 A1* 6/2011 Cheng ................... H01M 10/44
320/157

* cited by examiner

*Primary Examiner* — Vuthe Siek
(74) *Attorney, Agent, or Firm* — Greenberg Traurig, LLP

(57) ABSTRACT

A charging assembly and a charging control method are provided for charging a battery pack in a fast charging voltage value which is greater than the rated charging voltage value. The charging assembly includes a battery pack, a charger and a control system configured to control the charger to charge the battery pack with a constant charging current. The method includes: detecting the open-circuit voltage of each battery cell and screening out a maximum open-circuit voltage value, calculating a maximum charging duration and controlling the charger to charge the battery cell assembly with a constant current when the charging voltage is equal to the fast charging voltage value or reaches the maximum charging duration.

3 Claims, 6 Drawing Sheets

CHARGING ASSEMBLY AND CHARGING CONTROL METHOD

RELATED APPLICATION INFORMATION

This application claims the benefit of CN 201310666634.6, filed on Dec. 10, 2013, the disclosure of which is incorporated herein by reference in its entirety.

FIELD OF THE DISCLOSURE

The present disclosure relates generally to a charging assembly and a charging control method.

BACKGROUND OF THE DISCLOSURE

A battery cell serves as a power supplying source for an electrical tool, and its continuous operational capability is usually related to its electrical energy capacity. Increasing the electrical energy capacity of the battery cell can improve its continuous operational duration, which increases the weight of the battery cell and is contradictory to a purpose to obtain flexible operation of the battery cell. Besides, no matter how the electrical energy capacity is increased, indefinite continuous operation is unlikely to be achieved. Hence, currently a method for solving the problem of insufficient power quantity is to improve a charging efficiency of the battery cell, namely to employ a fast-charging manner to supplement sufficient power quantity for the battery cell in a time period that a user can wait.

A general charging method is to load a constant current on the battery load. In a beginning phase, the battery cell, as having a low power quantity, can allow electrical energy to be supplied quickly, and it is characterized in that the current value passing through the battery cell is constant in this phase. The electrical energy accepting capability of the battery cell falls after a period of time, and the battery cell is characterized in that a voltage at both ends thereof tends to be stable. The above charging manner is called a constant current-constant voltage (CC-CV) manner, wherein in the constant current (CC) phase the current is approximately stable, the charging quantity of the battery cell is in direct proportion to the current, and the charging speed is fast in this phase; when the charging enters the constant voltage (CV) phase, the charging current decreases along with the increase of the electrical charge of the battery cell; in the constant voltage phase, the charging speed is slow. Usually when the current decreases to a certain degree (for example, 0.05 C), the battery cell is believed to be fully charged, and the current is considered as a condition for stopping the charging and the charger automatically stops the charging.

Take charging of a SANYO UR18650RX lithium battery cell with 2.0 A as an example. Referring to Table 1 and FIG. 1, its constant current phase is about 45 minutes, its constant voltage phase is about 16 minutes, the constant voltage phase accounts for about 26% of the total charging time, that is, the constant voltage phase of the low-efficiency charging accounts for one quarter of the total charging time, which obviously does not meet the fast-charge requirements.

TABLE 1

| Constant current phase | Constant voltage phase | Total charging time | Percentage of CV phase |
| --- | --- | --- | --- |
| 2.0 A 45 | 16 | 61 | 26% |
| 4.0 A 26 | 15 | 41 | 37% |
| 6.0 A 16 | 14 | 30 | 48% |

According to ideas of those having ordinary skill in the art, the charging speed is generally quickened in a manner of increasing the current, and this manner is also a current fast-charge manner, for example, as shown in Table 1 and FIG. 2 and FIG. 3, in the case that the charging current is increased to 4.0 A and 6.0 A respectively to charge the previous SANYO UR18650RX lithium battery cell, it is found that as the charging current increases, the constant voltage phase accounts for a larger proportion of the total charging time. This fast-charge method is not worthwhile.

Generally speaking, when a battery cell leaves the factory, the battery cell manufacturer will indicate a recommended charging current value and battery cell capacity for the charging in the CC-CV manner, and correspondingly provide a charge cut-off current value and a corresponding cut-off voltage value. A battery cell assembly is composed of battery cells, and it has a rated charging voltage value and a rated charging current value which are according to the cut-off current value, cut-off voltage value and the connection of the battery cells.

The statements in this section merely provide background information related to the present disclosure and may not constitute prior art.

SUMMARY

In one aspect of the disclosure, a charging assembly comprises a battery pack having a battery cell assembly with a rated charging voltage value, a charger for charging the battery pack, and a control system configured to control the charger to charge the battery pack with a constant charging current the magnitude of which is equal to a first current value, and to stop the charging when the voltage of the battery pack is equal to a fast charging voltage value; the rated charging voltage value being smaller than the fast charging voltage value.

The battery cell assembly generally comprises at least one battery cell with a maximum electrical energy capacity value.

Furthermore, the control system may comprise an output current control module for controlling the output current of the charger, a first detection module configured to detect the voltage value of each battery cell, a time control module configured to control a duration of constant current charging performed, and a main controller configured to control the output current control module, the first detection module and the time control module.

In another aspect of the disclosure, a charging control method is provided for controlling the charging assembly. The method includes: detecting the open-circuit voltage of each battery cell and screening out a maximum open-circuit voltage value, calculating a maximum charging duration under the charging current with the first current value according to the maximum open-circuit voltage value and a correspondence relationship between the open-circuit voltage and the remaining power quantity of the battery cell, and controlling the charger to charge the battery cell assembly with a constant current the magnitude of which is equal to the first current value, and to stop the charging when the charging voltage is equal to the fast charging voltage value or reaches the maximum charging duration.

The fast charging voltage value is greater than the rated charging voltage value.

Further areas of applicability will become apparent from the description provided herein. It should be understood that the description and specific examples are intended for purposes of illustration only and are not intended to limit the scope of the present disclosure.

Figure 1:
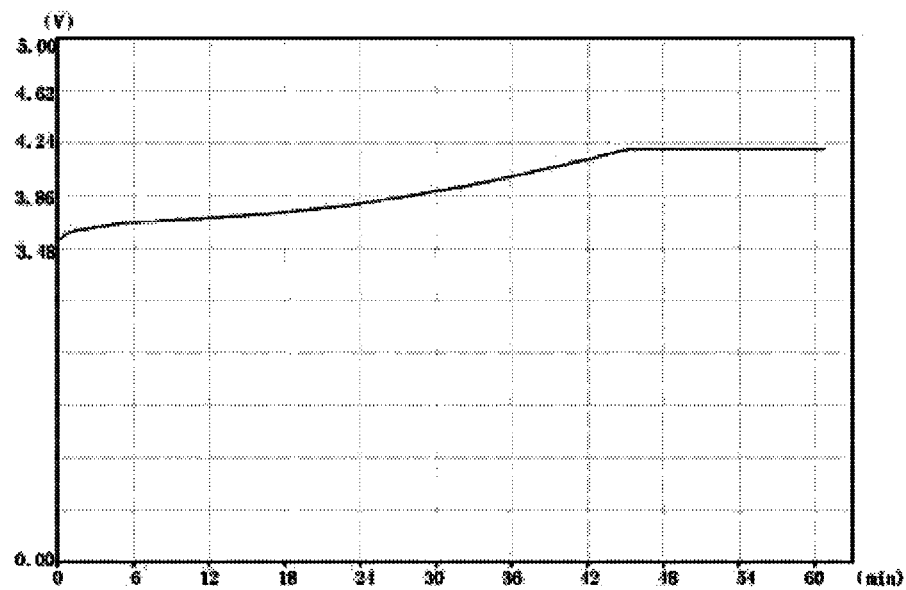
FIG. 1 illustrates a curve showing voltage and charging time at both ends of a SANYO UR18650RX lithium battery cell when being charged at a charging current 2.0 A in a CC-CV manner.
Figure 2:
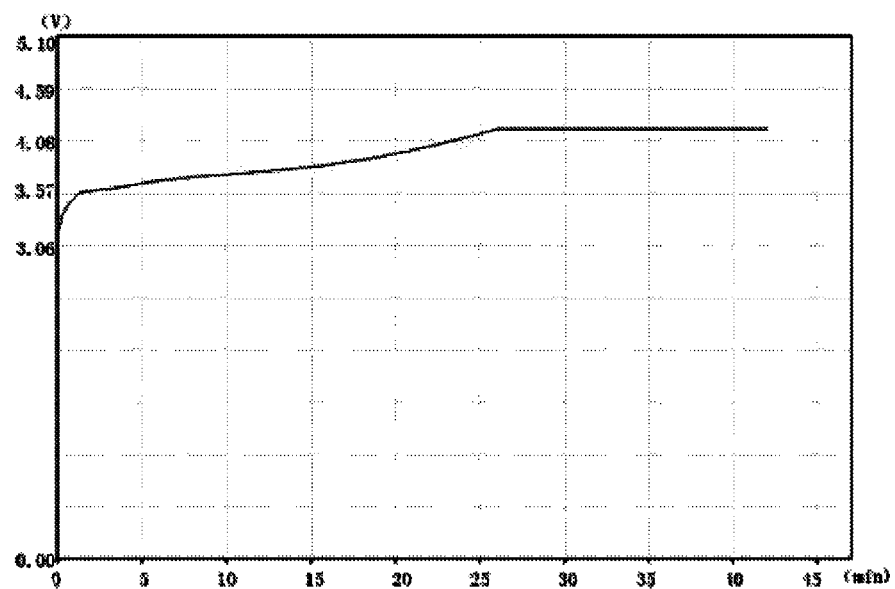
FIG. 2 illustrates a curve showing voltage and charging time at both ends of the SANYO UR18650RX lithium battery cell when being charged at a charging current 4.0 A in a CC-CV manner.
Figure 3:
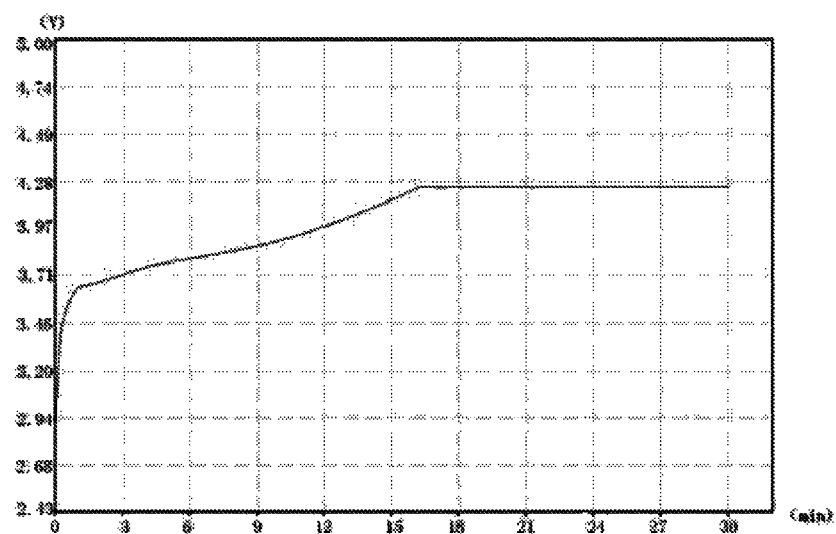
FIG. 3 illustrates a curve showing voltage and charging time at both ends of the SANYO UR18650RX lithium battery cell when being charged at a charging current 6.0 A in a CC-CV manner.

The drawings described herein are for illustrative purposes only of exemplary embodiments and not all possible implementations, and are not intended to limit the scope of the present disclosure. Corresponding reference numerals indicate corresponding parts throughout the several views of the drawings.

DETAILED DESCRIPTION

The following description of the preferred embodiments is merely exemplary in nature and is in no way intended to limit the scope of the invention as claimed, its application, or uses.

Figure 4:
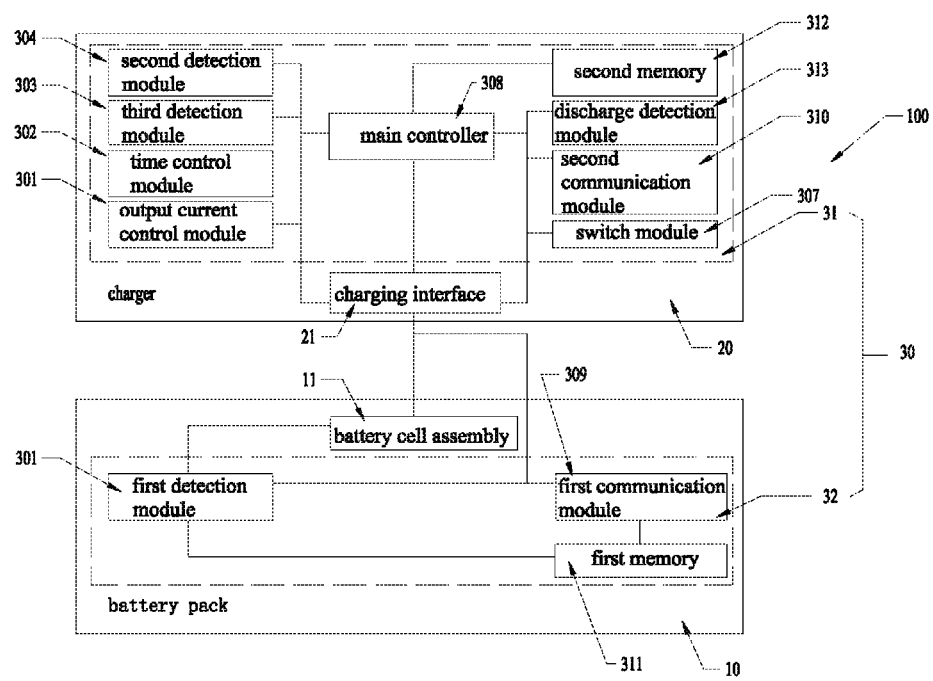
FIG. 4 illustrates a schematic structural block diagram of an exemplary embodiment of a charging assembly constructed according to the description which follows, wherein dotted-line boxes indicate portions of a control system disposed in a battery pack and a charger respectively.

As shown in FIG. 4, an exemplary charging assembly 100 mainly comprises two portions: a battery pack 10 and a charger 20.

The battery pack 10 comprises: a battery cell assembly 11 which consists of a plurality of battery cells, the battery cells each being capable of storing certain electrical energy and forming, through electrical connection, into a whole for storing electrical energy. The battery cell assembly 11 has a rated charging voltage which corresponds to a cut-off current when the battery cell assembly 11 is charged in an ordinary constant current-constant voltage manner, the preset voltage being obtained from a charging voltage of each battery cell indicated by a manufacturer and a specific electrical connection relationship. For purpose of easy description, it is believed that the preset voltage value is a rated charging voltage value, and a maximum electrical energy capacity of each battery cell is a maximum electrical energy capacity value.

The battery pack 10 further comprises a terminal for forming electrical connection and communication connection upon charging.

The charger 20 comprises a charging interface 21 forming electrical connection with the battery cell assembly 11, and the charging interface 21 should have a space for placing the battery pack 10 and a terminal forming an electrical connection and a communication connection with the battery pack 10. Certainly, the charger 20 further comprises some peripheral circuits for controlling the charging interface. These peripheral circuits enable a working state of the charging interface 21 to change, for example, enable it to be in an electrical energy output state, a disconnected state or an electrical energy consumption state.

The battery pack 10 and the charger 20 are two separable portions of the charging assembly 100 in respect of hardware. The charging assembly 100 further comprises: a control system 30, wherein one portion 31 of the control system is disposed in the battery pack 10, and the other portion 32 is disposed in the charger 20, and they can achieve the charging procedure by forming into a whole through communication upon charging. The control system can control the above charging interface to enable the battery cell assembly 11 electrically connected thereto to be in a charge, discharge or open-circuit state and to detect the battery cell assembly 11.

Specifically, referring to FIG. 4, the control system 30 comprises: an output current control module 301, a time control module 302, a first detection module 303, a second detection module 304, a third detection module 305, a discharge detection module 306, a switch module 307 and a main control model 308.

The output current control module 301 can control parameters when the charging interface 21 charges the battery cell assembly 11, for example, electrical parameters such as charging current and charging voltage. Specifically, the output current control module 301 can enable the charging interface 21 to charge the battery cell assembly 11 with a constant charging current which magnitude is equal to the first current value, and stop the charging when the charging voltage is equal to the fast charging voltage value. The fast charging voltage value for stopping the charging is greater than the above-mentioned rated charging voltage value. Regarding advantages of such a charging method, please refer to the subsequent description of the method.

The output current control module 301 may directly control the charging interface 21, or feed back a signal to the main controller 308 and then the main controller 308 controls the charging interface 21, or the charging interface 21 may be controlled by integrating the two manners. Therefore, the output current control module 301 may be electrically connected to the charging interface 21 or form electrical connection with the main controller 308.

The time control module 301 is configured to control a maximum duration of the charging of the charging interface 21. When the charging duration satisfies the maximum charging duration, it can directly or indirectly control the charging interface 21 to stop the charging. Like the output current control module 301, the time control module 302 may directly control the charging interface 21, or feed back a signal to the main controller 308 and then the main controller 308 controls the charging interface 21, or the charging interface 21 may be controlled by integrating the two manners. Therefore, the time control module 302 may be electrically connected to the charging interface 21 or form electrical connection with the main controller 308.

The output current control module 301 and the time control module 302 are relatively independent control modules; when any one of them meets conditions for stopping the charging, the charging interface 21 will be controlled to stop the charging.

The first detection module 308 can detect the open-circuit voltage of each battery cell in the battery cell assembly 11, and select a maximum one among all open-circuit voltages as a maximum open-circuit voltage value, and feed back to the main controller 308. The main controller 308 calculates a maximum charging duration according to the maximum open-circuit voltage value, and the time control module 302 performs time control. As a preferable solution, the main controller 308 or the time control module 302 has a timer.

The second detection module 304 can, through the charging interface 21, detect a DC internal resistance of the battery cell assembly 11, and feed back the data of the DC internal resistance to the main controller 308; the third detection module 305 can, through the charging interface 21, detect the charging voltage and charging current loaded to the battery cell assembly 11.

The first detection module 303 is used to detect a state of the electrical energy unit in the battery cell assembly 11, and electrically connected to the battery cell assembly 11. The second detection module 304 and the third detection module 305 each form electrical connection with the charging interface 21 and the main controller 308 respectively, to transmit the electrical energy and signal.

Referring to FIG. 4, the output current control module 301, the time control module 302, the main controller 308, the second detection module 304, and the third detection module 305 in the control system 30 are disposed in the charger 20, and the first detection module 303 is disposed in the battery pack 10.

Since the battery pack 10 and the charger 20 are two separable portions, in order to allow portions of the control system 30 respectively disposed therein to constitute a whole that can achieve a uniform function, as a preferred solution, the control system 30 further comprises: a first communication module 309 disposed in the battery pack 10, and a second communication module 310 disposed in the charger 20, wherein a wired or wireless communication connection can be formed therebetween when it is desired to transmit data information. The wired connection manner may be implemented via connection terminals between the charging interface 21 and the battery pack 10, and the wireless connection may employ wireless communication technology such as Bluetooth. When wired communication is employed, the first communication module 309 is electrically connected to the charging interface 21, and the second communication module 301 is electrically connected to the charging interface 21 and the main controller 308 respectively.

In a preferred solution, in order to implement the charging method of the present invention, the control system 30 further comprises: a first memory 311 disposed in the battery pack 10 and a second memory 312 disposed in the charger 20, wherein the first memory stores data recording the rated charging voltage value and the maximum electrical energy capacity value and correspondence relationship data of the open-circuit voltage value and the remaining energy. The second memory 312 may be used to store data from the first memory 311.

Specifically, the first memory 311 constitute the electrical connection with the first detection module 303 and the first communication module 309 respectively, the first detection module 303 can read data information of the first memory 311, the main controller 308 may read data in the first memory 311 through the first communication module 309 and the second communication module 310 that are communicatively connected with each other, and stores the data into the second memory so that the data are invoked by other modules in the portion 31 of the control system 30 located in the charger 20.

In a preferred embodiment, in order to obtain data that is necessary for using the charging method herein described, the control system 30 further comprises: a discharge detection module 313 configured to detect a discharge voltage and a discharge current when the battery cell assembly 11 is in a discharge state in the battery pack 10, the discharge detection module 313 being disposed in the charger 20. The discharge detection module 313 is electrically connected with the charging interface 21 to transmit electrical energy and with the main controller 308 to transmit signals, and it is used to detect electrical parameters of the battery cell assembly 11 in the discharge state.

In a preferred solution, the control system 30 further comprises: a switch module 314 configured to control the charging interface 21, under the control of the main controller 308, to allow the battery cell assembly 11 connected thereto to be in a charge, discharge or open-circuit state. The switch module 314 functions to switch an electrical loading state of the battery cell assembly 11 so that other portions in the control system 30 can perform corresponding functions. The switch module 314 is electrically connected with the charging interface 21 to transmit electrical energy and with the main controller 308 to transmit signals.

In the charging control method, the control system 30 detects the open-circuit voltage of each battery cell and screens out a maximum open-circuit voltage value, and calculates the maximum charging duration under the charging current with the first current value according to the maximum open-circuit voltage value and the correspondence relationship between the open-circuit voltage and the remaining power quantity of the battery cell; the control system 30 controls the charging interface 21 to charge the battery cell assembly 11 with a constant current with a magnitude equal to the first current value, and to stop the charging when the charging voltage is equal to the fast charging voltage value or the maximum charging duration is reached, wherein the fast charging voltage value is greater than the rated charging voltage value.

The voltage control is intended to implement fast charging, and time control is intended to ensure charging security on the basis of voltage control.

The rated charging voltage value, the maximum electrical energy capacity value and the relationship between the open-circuit voltage and the power quantity of the battery cell may be measured according to the data provided by the battery cell manufacturer or when the battery cell is not yet assembled into the battery pack 10, and the data are stored in the first memory 311.

In a preferred solution, a method of determining the fast charging voltage value is as follows: the fast charging voltage value is equal to the rated charging voltage value plus a result obtained through multiplying the determined first current value by the DC internal resistance of the battery cell assembly 11. Therefore, relatively speaking, different first current values correspond to different fast charging voltage values. The DC internal resistance of the battery cell assembly 11 may be obtained according to the data provided by the battery cell manufacturer or obtained through detection, and the data are stored in the first memory 311. To determine the DC internal resistance more accurately, in a preferred solution, before charging each time, the main controller 308 may control the third detection module to first detect the DC internal resistance through the charging interface 21 to determine instant DC internal resistance.

Figure 8:
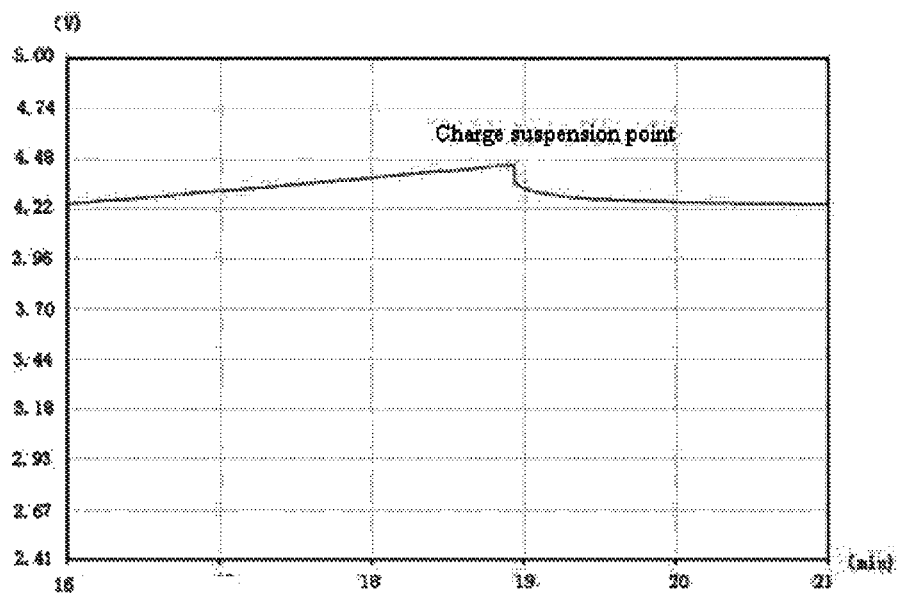
FIG. 8 illustrates a curve diagram showing relationship of charging voltage and time after suspending of the charging after the SANYO UR18650SA lithium battery cell is charged at a charging current 4.0 A in a constant current charging manner according to the description which follows for a certain time period.

In a preferred solution, when specific charging is performed, the battery cell assembly 11 may, first, be charged with a constant value with the first current value until the charging voltage of battery cell assembly 11 reaches the rated charging voltage value. At this time, the control system 30 suspends the charging for the battery cell assembly 11 and detects real-time open-circuit voltage of the battery cell assembly 11 to calculate a voltage drop. Due to presence of the DC internal combustion, after the charging is suspended, the open-circuit voltage of the battery cell assembly 11 falls to a certain degree. If the voltage drop resulting from this fall is divided by the first current value, a dynamic DC internal resistance of the battery cell assembly 11 at this time can be obtained, and then the fast charging voltage value can be determined, or the voltage drop is directly added up with the rated charging voltage value to determine the fast charging voltage value. Furthermore, as shown in FIG. 8, since the open-circuit voltage after the stop of the charging does not get stable very soon, but undergoes a dynamic variation procedure which usually lasts over 10 minutes, a lot of time will be wasted if the voltage drop is determined and thereby the fast charging voltage value is determined after the open-circuit voltage completely gets stable. As known by referring to the curve of FIG. 8, after the suspending of the charging, a major portion of the voltage drop is produced in a short time period, and then the voltage tends to drop slower and varies a little. Therefore, in order to obtain the voltage drop quickly, a threshold of a drop rate may be set. Once the drop rate is smaller than the threshold, it may be believed that the voltage reaches a stable state. Preferably, the threshold is 40 mV/min. Noticeably, in the absence of the preset fast charging voltage value or DC internal resistance value, the above solution may be employed. Besides, the DC internal resistance changes constantly in the charging procedure, so the above preferred solution may be employed if a more accurate fast charging voltage value is desired. Furthermore, in order to constantly approach the fast charging voltage value conforming to the actuality, a procedure may be employed: after the rated charging voltage value, suspending the charging repeatedly to determine the voltage drop, and adding the voltage drop on the basis of the voltage upon the suspending of the charging to determine the fast charging voltage value. The specific times of suspending the charging may be achieved by setting a time cycle of suspending the charging and detecting the voltage drop and the voltage threshold for stopping the detection, for example, setting a procedure of beginning to suspend the charging for the first time upon reaching the rated charging voltage value, detecting the voltage drop and determining the fast charging voltage value, recording the voltage drop, setting two minutes as a time cycle, and repeating the above procedure cyclically. Whichever detection, when the voltage drop satisfies a certain threshold, the above procedure of determining the voltage drop is stopped, and the fast charging voltage value calculated from the last calculation is regarded as a final target voltage value to perform constant current charging until the final target voltage value is reached; or setting an open-circuit voltage value upon suspending the charging to determine, i.e., performing the above procedure of suspending the charging, detecting the voltage drop and determining the fast charging voltage value upon reaching some voltage values, regarding the fast charging voltage value obtained from detection when a maximum one of these voltage values is reached as the final target voltage value to perform constant current charging until the final target voltage value is reached.

Preferably, for the sake of security, the first current value may employ the charging current recommended by the battery cell manufacturer, the time control module 31, according to the maximum open-circuit voltage value and the correspondence relationship between the open-circuit voltage and the remaining power quantity of the battery cell, calculates the maximum charging duration under the charging current with the first current value, and performs time control for the charging procedure by feeding back a control signal to the main controller.

In a preferred solution, when the data of relationship of the open-circuit voltage value of the battery cell and the power quantity is not pre-stored, the first detection module 303 performs detection for all battery cells, selects one with the maximum open-circuit voltage, records the voltage value U1 of the battery cell at this time, and feeds back the information to the main controller 308. Subsequently, the main controller 308 controls the charging interface 21 to test-charge the battery cell assembly 11 for a period of time with the first current value; after completion of the test charging, the main controller 308 can calculate the power quantity $\Delta C$ allocated to each battery cell according to the test-charge charging current and the test-charge duration and the arrangement of the battery cell assembly 11, then, the first detection module 303 again detects a voltage value U2 of the battery cell that is selected just now at this time. The relationship between the voltage and power quantity may be calculated according to a nominal voltage (namely the rated charging voltage value) U3 of the battery cell and a nominal electrical energy value (namely, a first point energy value) thereof.

If it is believed that the open-circuit voltage of the battery cell is in a coefficient relationship with the capacity, namely $U=kC$, wherein k is coefficient, $U1=kC1$, $U2=kC2$. The two equations are subtracted, $U2-U1=k(C2-C1)$, namely, $U2-U1=k\Delta C$. Therefore, the coefficient k can be calculated. Then, according to the coefficient k and U3 and C3, the remaining electrical energy capacity of the current battery cell can be calculated and thereby a maximum charging time may be calculated in combination with the current of the constant current charging.

Figure 9:
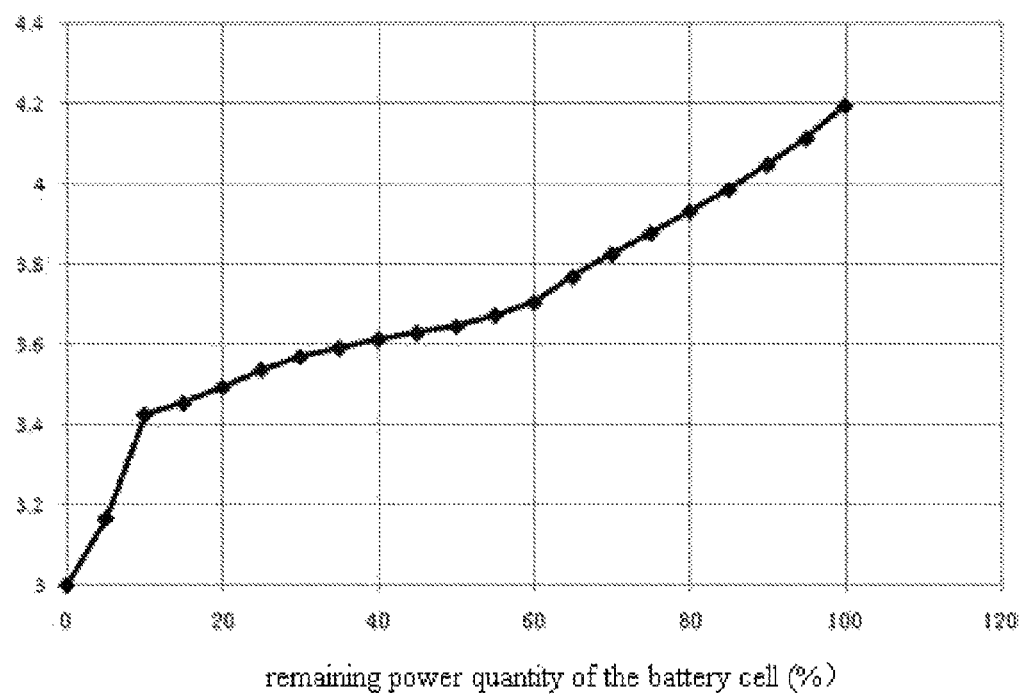
FIG. 9 illustrates a diagram showing correspondence relationship of voltage and power quantity of the SANYO UR18650SA lithium battery cell.

As shown in FIG. 9, the correspondence relationship between the voltage and power quantity of the battery cell is not invariable, that is, the coefficient k is variable. Therefore, if a lower power quantity phase is selected as the test-charge phase for detecting the value of k, the k value is very inaccurate. Hence, more preferably, the constant current charging is performed with the first current value first until the charging voltage of the battery cell assembly 11 reaches the rated charging voltage value, and then detection in the test-charge phase is performed, thereby determining a more accurate relationship between the voltage and power quantity when the battery cell 11 is charged approximately full, and then calculating the remaining power quantity and then performing time control in combination with the charging current.

As a preferred solution, data about the DC internal resistance, the fast charging voltage value, the relationship of the voltage and the power quantity that are calculated by the above method may be stored by the control system 30 in the first memory 309 and/or the second memory 312, so that the data can be invoked and is not necessary to be measured and calculated again when charging is performed next time. More preferably, when the data are only stored in the second memory 312, the control system 30 allocate a data tag to it according to the distinguishing of the battery pack 10 so that different relevant data are invoked according to the data tag upon charging. When the data are stored in the first memory 309, the battery pack 10 may achieve the charging by reading the first memory 309 at a different charger 20, needless to perform measurement and calculation again.

Preferably, the first detection module 303 detects the open-circuit voltage of each battery cell in turn. Upon detection for one battery cell, the first detection module 303 will first judge whether the open-circuit voltage of the battery cell reaches a stability standard. Only in the case of reaching the stability standard will the measured voltage value be regarded as an accurate open-circuit voltage.

Specifically, the charging method comprises the following steps:

(1) The main controller 308 controls the charging interface 21 to detect whether the battery pack is already connected, proceeds to step (2) if the battery pack is already connected, or remains in step (1) if the battery pack is not yet connected.

(2) The output current control module 31 detects whether the first memory 311 of the connected battery pack 10 has effective data of the rated charging voltage value, the fast charging voltage value, the first current value, the maximum electrical energy capacity value and the correspondence relationship of the open-circuit voltage and the remaining electrical energy: proceed to step (3) if yes; return to step (1) if no.

(3) The output current control module 31 reads the data stored in the first memory 311 and feeds back the read data to the main controller 308, and then proceeds to step (4).

(4) The main controller 308, through the switch module, controls the charging interface 21 to make the battery cell in the battery pack 10 be in an open-circuit state, the first detection module 33 detects the open-circuit voltage of each battery cell and feeds back the maximum open-circuit voltage value to the main controller 308, and then the flow proceeds to step (5).

(5) The main controller 308 determines a maximum charging duration according to the maximum open-circuit voltage value and the correspondence relationship of the open-circuit voltage of the battery cell in the first memory 311 and the remaining power quantity, in combination with the first current value read by the output current control module 301, and sends the duration data to the time control module 320, and then the flow proceeds to step (6).

(6) The main controller 308, through the output current control module 301, controls the switch module 37 and the charging interface 21 to charge the battery cell assembly 1121 with a constant charging current with a magnitude equal to the first current value, and meanwhile monitors the charging voltage and charging duration of the battery cell assembly 1121 through the third detection module 35 and the time control module 32 respectively, and stops the charging when the charging voltage value is equal to the fast charging voltage value or the charging duration is equal to the maximum charging duration.

Figure 5:
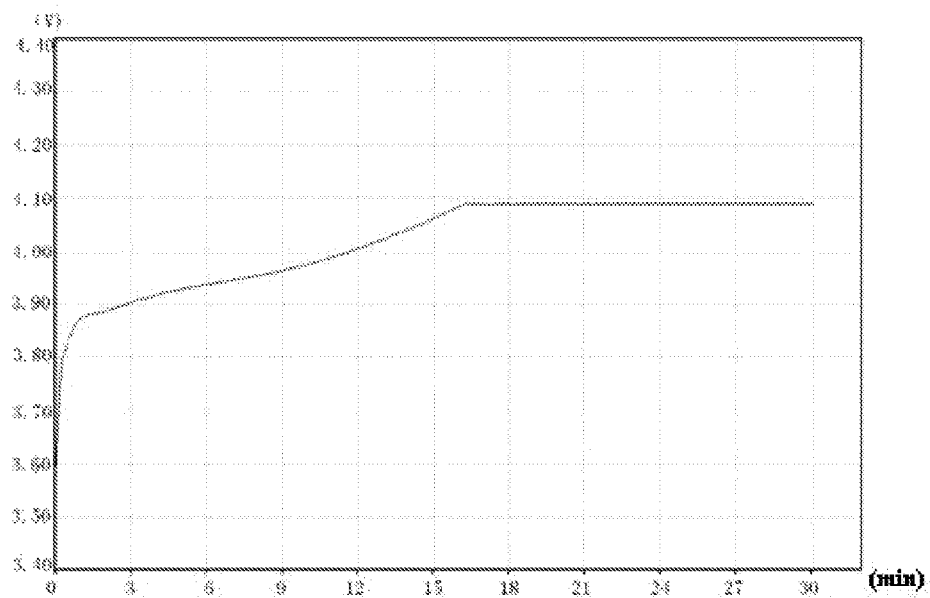
FIG. 5 illustrates a curve showing voltage and charging time at both ends of a SANYO UR18650SA lithium battery cell when being charged at a charging current 4.0 A in a CC-CV manner.
Figure 6:
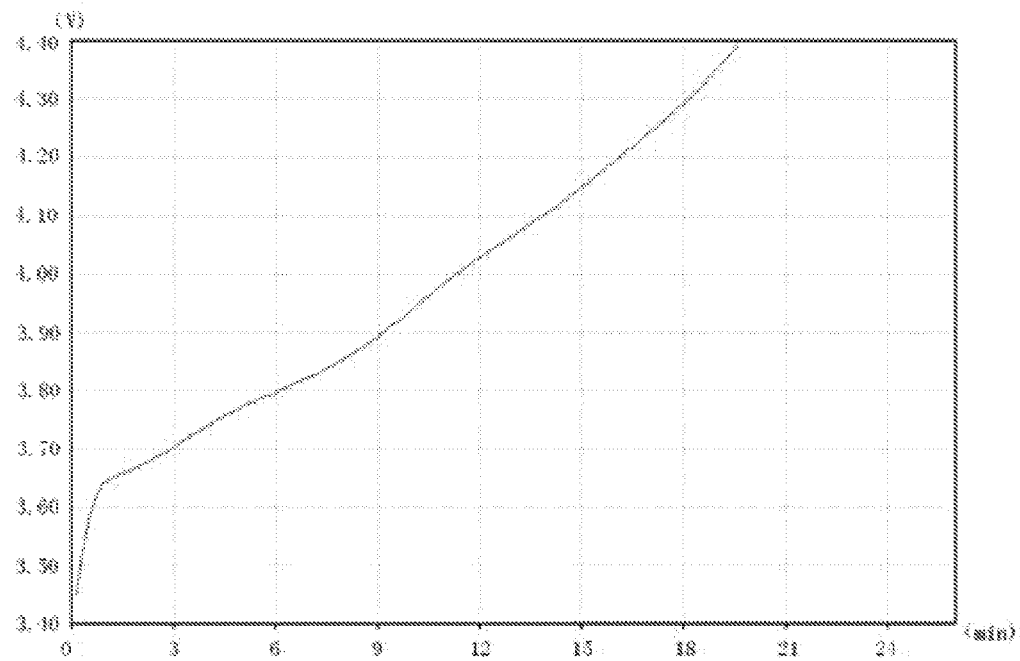
FIG. 6 illustrates a curve showing voltage and charging time at both ends of the SANYO UR18650SA lithium battery cell when being charged at a charging current 4.0 A in a constant current charging manner according to the description which follows.

Referring to FIGS. 5-6, a SANYO UR18650SA lithium battery cell is taken as an example for detection. The SANYO UR18650SA lithium battery cell has a nominal capacity of 1250 mAh, a fast-charge current (which may be regarded as the first current value) 4 A, a cutoff voltage (namely, the rated charging voltage value) 4.2V. When the SANYO UR18650SA lithium battery cell is charged with 4.0 A in a constant current-constant voltage manner, the correspondence curve of the voltage at both ends of the battery cell and the charging time is as shown in FIG. 5, a charging duration thereof is 26 minutes and a measured charged power quantity thereof is 103%, namely, 1282 mAh.

When the SANYO UR18650SA lithium battery cell is charged with 4.0 A in a constant current charging manner according to the present invention, the correspondence curve of the voltage at both ends of the battery cell and the charging time is as shown in FIG. 6. The DC resistance thereof as measured is $0.04\Omega$, 4 A is taken as the first current value of constant current charging, the cutoff voltage (namely, the fast charging voltage value) is calculated as $4.2V+4\ A\times 0.04\ \Omega=4.36V$, a charging duration thereof is 19 minutes and a measured charged power quantity thereof is 101%, namely, 1267 mAh.

It can be seen that the method of the present invention can save a substantial proportion of time.

Figure 7:
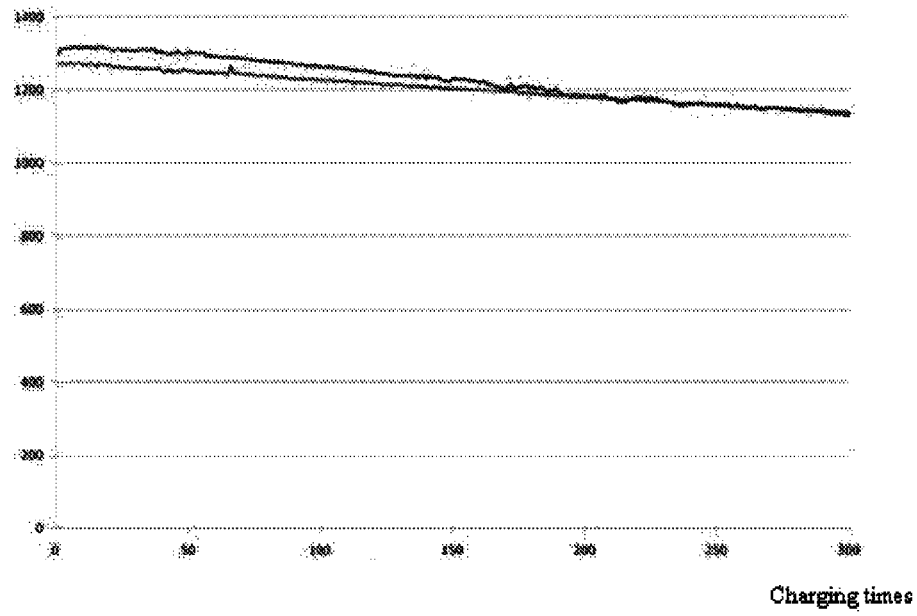
FIG. 7 illustrates a contrast diagram of service life when the SANYO UR18650SA lithium battery cell is charged at a charging current 4.0 A in a CC-CV manner and when the SANYO UR18650SA lithium battery cell is charged at a charging current 4.0 A in a constant current charging manner according to the description which follows.

Charging is performed again and again by using the above two methods to compare their influence on the service life. Specifically as shown in FIG. 7, the curve above at a starting point of the transverse coordinate shows the charging method in the constant current to constant voltage manner, and the curve below shows the charging method according to the present invention. It can be seen that when the charging times exceed 200 times, the charging method according to the subject disclosure, as compared with current methods, does not have a distinct difference and exhibits a more improved tendency.

The above illustrates and describes basic principles, main features and advantages of the present invention. Those skilled in the art should appreciate that the above embodiments do not limit the present invention in any form. Technical solutions obtained by equivalent substitution or equivalent variations all fall within the scope of the present invention.

What is claimed is:

1. A charging assembly, comprising:
    a battery pack comprising a battery cell assembly with a rated charging voltage value;
    a charger for charging the battery pack; and
    a control system configured to control the charger to charge the battery pack with a constant charging current the magnitude of which is equal to a predetermined current value, and to stop the charging when the voltage of the battery pack is equal to a predetermined voltage value;
    wherein the rated charging voltage value is smaller than the predetermined voltage value and the battery cell assembly comprises at least one battery cell with a maximum electrical energy capacity value,
    wherein the control system comprises:
        an output current control module for controlling the output current of the charger;
        a first detection module configured to detect the voltage value of each battery cell;
        a time control module configured to control a duration of constant current charging performed;

a main controller configured to control the output current control module, the first detection module and the time control module;

a second detection module configured to detect a value of DC resistance of the battery cell assembly;

a first communication module;

a second communication module configured to communicated with the first communication module;

a first memory for storing the data of the rated charging voltage value and the maximum electrical energy capacity value; and a second memory configured to store data and feed it back to the main controller, wherein the first communication module and the first memory are disposed in the battery pack and the second communication module and second memory are disposed in the battery pack; and a third detection module configured to detect values of a current and a voltage of the battery cell assembly when the battery pack is charged by the charger wherein the output current control module, the time control module, the main controller, the second detection module and the third detection module in the control system are disposed in the charger, and the first detection module is disposed in the battery pack.

2. The charging assembly according to claim 1, wherein the control system further comprises a discharge detection module configured to detect a discharge voltage and a discharge current of the battery cell assembly in a discharge state and wherein the discharge detection module is disposed in the charger.

3. A charging control method for controlling a charging assembly, the method comprising:

detecting an open-circuit voltage of each battery cell in a battery cell assembly and determining a maximum open-circuit voltage value for each of the battery cells in the battery cell assembly;

calculating a maximum charging duration under a charging current equal to a first current value calculated according to the determined maximum open-circuit voltage value; and controlling a charger to charge the battery cell assembly with a constant current having a magnitude that is equal to the first current value, and to stop the charging when a charging voltage is equal to a predetermined fast charging voltage value or reaches the calculated maximum charging duration;

wherein the fast charging voltage value is greater than the rated charging voltage value, (1) determining whether the battery cell assembly is connected with the charger and proceeding to step (2) if the battery cell assembly is already connected with the charger, or remaining in step (1) if the battery cell assembly is not yet connected with the charger;

(2) detecting whether a first memory of the connected battery pack has effective data and proceeding to step (3) if yes and returning to step (1) if no;

(3) reading the data stored in the first memory, and then proceeding to step (4);

(4) detecting the open-circuit voltage of each battery cell in the battery cell assembly and feeding back the maximum open-circuit voltage value to a main controller, and then proceeding to step (5);

(5) calculating a maximum charging duration according to the maximum open-circuit voltage value, the correspondence relationship of the open-circuit voltage and the remaining power quantity of the battery cell in the first memory, and the rated current value, and sending the duration data to the time control module, and then proceeding to step (6);

(6) charging the battery cell assembly with a constant charging current with a magnitude equal to the first current value, and meanwhile monitoring the charging voltage and charging duration of the battery cell assembly through the third detection module and the time control module respectively;

(7) stopping the charging when the charging voltage value is equal to the fast charging voltage value or the charging duration is equal to the maximum charging duration.

* * * * *